US010269383B2

United States Patent
Ooi et al.

(10) Patent No.: US 10,269,383 B2
(45) Date of Patent: Apr. 23, 2019

(54) IONIC PERFLUOROPOLYETHER LUBRICANT

(71) Applicant: FUJI ELECTRIC (MALAYSIA) SDN, BHD., Kulim, Kedah Darul Aman (MY)

(72) Inventors: Yew Hong Ooi, Kedah Darul Aman (MY); Yeng Yeng Por, Kedah Darul Aman (MY); Khairul Azlan Bin Saleh, Kedah Darul Aman (MY)

(73) Assignee: FUJI ELECTRIC (MALAYSIA) SDN, BHD., Kulim, Kedah Darul Aman (MY)

(*) Notice: Subject to any disclaimer, the term of this patent is extended or adjusted under 35 U.S.C. 154(b) by 177 days.

(21) Appl. No.: 15/181,485

(22) Filed: Jun. 14, 2016

(65) Prior Publication Data

US 2017/0032813 A1   Feb. 2, 2017

(30) Foreign Application Priority Data

Jul. 31, 2015   (MY) .............................. 2015 702511

(51) Int. Cl.
*G11B 5/66* (2006.01)
*G11B 5/725* (2006.01)
(Continued)

(52) U.S. Cl.
CPC ............ *G11B 5/725* (2013.01); *C08G 65/007* (2013.01); *C08G 65/3312* (2013.01);
(Continued)

(58) Field of Classification Search
None
See application file for complete search history.

(56) References Cited

U.S. PATENT DOCUMENTS

| 5,498,457 A | 3/1996 | Ishihara et al. |
| 7,354,629 B2 | 4/2008 | Nagata |

(Continued)

FOREIGN PATENT DOCUMENTS

| JP | H05-205253 A | 8/1993 |
| JP | 2015-40244 A | 3/2015 |

OTHER PUBLICATIONS

Kondo, "Protic Ionic Liquids with Ammonium Salts as Lubricants for Magnetic Thin Film Media", Tribol Lett, vol. 31, 22 211-218, Jan. 2008.*

(Continued)

*Primary Examiner* — Holly C Rickman
(74) *Attorney, Agent, or Firm* — Rabin & Berdo, P.C.

(57) ABSTRACT

An ionic lubricant includes a single lubricant compound having a perfluoropolyether main chain, wherein each end of the perfluoropolyether main chain is terminated by an end group, and at least one of the end groups includes an ionic bond and at least one functional group. The ionic perfluoropolyether lubricant has unique characteristics that allows its ultra-thin and uniform distribution over a protective overcoat layer of a magnetic recording medium, while at the same time providing its molecules with strong adhesion power to the protective overcoat layer of the magnetic recording medium compared to existing lubricants, so as to provide shorter magnetic spacing between the magnetic recording medium and the magnetic head, and enable longer operation hours for the magnetic recording medium.

13 Claims, 1 Drawing Sheet

(51) Int. Cl.
*C10M 107/38* (2006.01)
*C09D 171/00* (2006.01)
*C08G 65/00* (2006.01)
*C08G 65/331* (2006.01)
*C08G 65/332* (2006.01)
*C08G 65/333* (2006.01)

(52) U.S. Cl.
CPC ... *C08G 65/3322* (2013.01); *C08G 65/33306* (2013.01); *C08G 65/33313* (2013.01); *C08G 65/33396* (2013.01); *C09D 171/00* (2013.01); *C10M 107/38* (2013.01); *C10M 2213/043* (2013.01); *C10N 2240/204* (2013.01); *C10N 2250/08* (2013.01)

(56) References Cited

U.S. PATENT DOCUMENTS

| | | | |
|---|---|---|---|
| 8,951,628 B2* | 2/2015 | Burger | B32B 27/12 |
| | | | 428/319.3 |
| 8,980,449 B2 | 3/2015 | Matsumoto et al. | |
| 2002/0090536 A1* | 7/2002 | Dai | B82Y 10/00 |
| | | | 428/835.8 |
| 2017/0058227 A1* | 3/2017 | Kondo | C10M 135/10 |
| 2017/0130156 A1* | 5/2017 | Kondo | C07C 309/06 |
| 2017/0137736 A1* | 5/2017 | Kondo | G11B 5/725 |

OTHER PUBLICATIONS

Kondo, "Tribochemistry of Ionic Liquid Lubricant on Magnetic Media". Advances in Tribology. vol. 2012, Article ID 526726, pp. 1-20 Jan. 2012.*

* cited by examiner

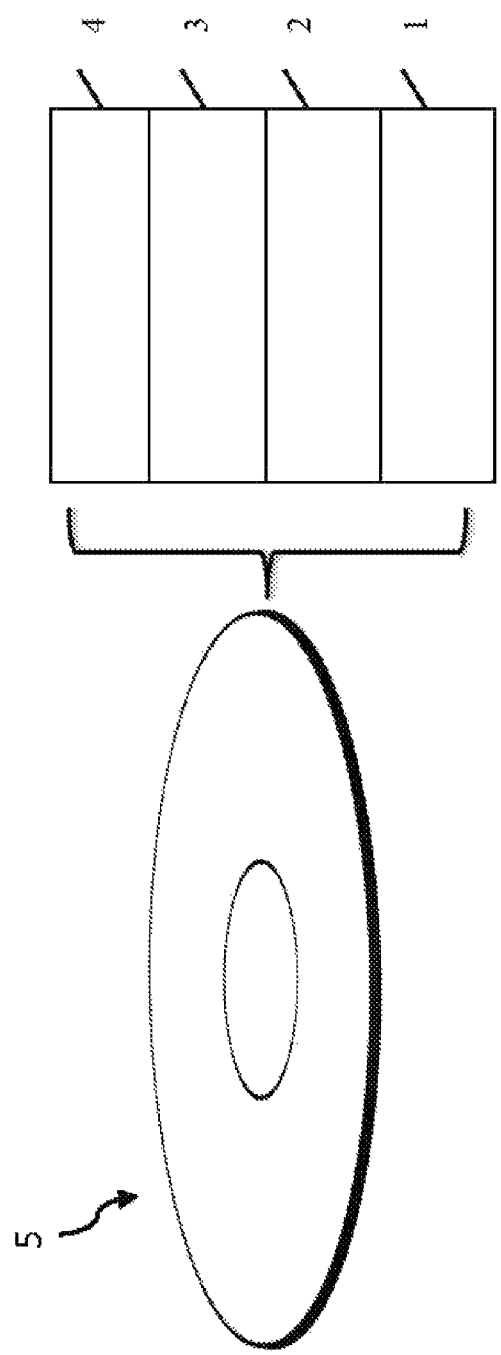

IONIC PERFLUOROPOLYETHER LUBRICANT

CROSS-REFERENCE TO RELATED APPLICATION

This non-provisional Application for a U.S. Patent claims the benefit of priority of MY PI 2015 702511 filed Jul. 31, 2015, the entire contents of which is hereby incorporated by reference.

BACKGROUND OF THE INVENTION

1. Field of the Invention

The present invention relates to a lubricant. The invention particularly relates to a lubricant suitable for use in magnetic recording medium mounted in magnetic storage devices for computers, laptops and the like. More specifically, the present invention relates to a lubricating layer disposed over a protective layer of a magnetic recording medium.

2. Background of the Related Art

Magnetic storage devices such as hard disk drives (HDD) comprise a magnetic recording medium (MRM, or magnetic disk) rotating at high speeds, and a magnetic head facing the MRM. Data are written to the MRM and data written on the MRM are read by the magnetic head flying just above the surface of the MRM. The data recording density becomes greater (and therefore more data is stored given the same surface area) when the magnetic spacing is reduced. The magnetic spacing is defined by the distance between the magnetic recording layer of the MRM and the reading portion of the magnetic head.

Recently, the magnetic spacing has been reduced to extreme low levels to satisfy the demands for ever increasing hard disk drive capacity, and the chance of the magnetic recording medium (MRM) making contact with the magnetic head increases as a result. To protect the magnetic layer of the MRM from wear and damage due to contact with the magnetic head, a protective overcoat layer (also known as protective layer) is laminated over the magnetic recording layer, and to allow the magnetic head to smoothly glide off the MRM whenever they inevitably make contact with each other, a lubricating layer is further laminated over the protective overcoat layer.

Perfluoropolyether (PFPE) lubricant is the type of lubricant most commonly used for this purpose as it has high wear resistance, high stability and other features that make it most suitable for lamination over the protective overcoat layer. As the magnetic spacing is further reduced over time, various improvements of PFPE lubricants have been studied and devised to accommodate the ever narrowing distance between the MRM and the magnetic head.

Various types of functional groups are known to be added to an end group (also known as a terminal group) of a PFPE. They include, for example: the —OH group, the —COOH group, the —$NH_2$ group, and a phenyl ($C_6H_5$) group. The characteristics of the lubricant differ greatly not only by the type of functional group used, but also by the number of functional group(s) that exist within each molecule of the lubricant. Therefore, various functional groups (and combinations of them) have been added to a PFPE, including for example adding one —OH to one of the PFPE's end group, two —OH to one of the PFPE's end group, or one —OH to both of the PFPE's end groups, and so on to produce lubricants of vastly different characteristics.

Another method of producing PFPE lubricants with the desired characteristics is to mix different types of PFPE-based lubricants. For example, U.S. Pat. No. 8,980,449 discloses a mixture of two types of PFPE lubricants. One of them is a PFPE lubricant with two —OH groups in each of its end groups. The other has a PFPE main chain and two —OH groups within one end group and a cyclic triphosphazene group within the other end group. The resultant mixture was a lubricant with the advantages of both originating PFPE lubricants.

A further method of producing PFPE lubricants with the desired characteristics is to use two PFPE lubricants containing highly reactive molecules. U.S. Pat. No. 5,498,457 discloses a chemical reaction after two types of PFPE lubricants with highly reactive end groups are mixed. The lubricant mixture eventually formed a stable and bulky network after the lubrication layer has been applied to the magnetic recording medium. The two types of molecules provided by the two PFPE lubricants underwent ionic interaction at their functional groups. According to one of the examples of U.S. Pat. No. 5,498,457, when the lubricant mixture is made up of one lubricant molecule having carboxyl group at both ends, and another lubricant molecule having amino group at both ends, the carboxyl groups and the amino groups of the two lubricant molecules would eventually react to give rise to ammonium carboxylate salt. The reaction propagates across the entire lubricant layer until all the reactive end groups have reacted with each other, eventually forming a large molecular network. Furthermore, if the lubricant molecules have excess functional groups, these function as groups adsorbable onto the disk surface.

Owing to the efforts as described earlier, PFPE lubricants have been improved. However, the never ending reduction of the magnetic spacing necessitates further improvements to the lubricants used to protect the magnetic recording medium. Hard disk drives are demanded to be made smaller with each passing year, while at the same time their storage capacities are being demanded to double or triple in size to accommodate vast amounts of digital data.

Essentially, a lubricant layer laminated over the protective overcoat layer of a magnetic recording medium (MRM) has to improve over time in the following four areas.

(1) The lubricant layer deposited over the protective overcoat layer must become increasingly thinner in order to allow the magnetic head to fly closer to the magnetic layer. This improves read/write performance, and also increases the capacity of the magnetic recording medium.

(2) The lubricant molecules must develop stronger affinity to the MRM disk surface to minimize scattering by centrifugal force. The stronger the affinity, the longer the lubricant molecules will stay attached to the MRM. This in turn provides the hard disk drive with a longer service life. The molecules' strong affinity to the MRM disk surface also allow the MRM to spin faster (higher RPM), thus improving read/write speed of the hard disk drive.

(3) The lubricant molecules must form an increasingly uniform film over the protective overcoat layer (or protective layer) with better surface coverage. The more uniform the molecules are spread over the protective overcoat layer, the closer the magnetic head can fly over the MRM without making contact with the MRM surface.

(4) The lubricant molecules must become increasingly durable in terms of MRM weariness. Hard disk drives become hot when in use, and lubricant molecules when heated to a certain degree will start to evaporate. Also, wear and tear will be faster as the ever reducing magnetic spacing causes the magnetic head to make contact with the MRM more often when they are in use.

Also, lubricant molecules with a lower coefficient of friction are always desired. The ability of these molecules to self-replenish is also desired. The contacts between the MRM with the magnetic head will undoubtedly sometimes remove some lubricant molecules from the MRM surface. When this happens, adjacent molecules redistribute, and fill whatever gaps on the MRM surface the contact has left behind.

In cases such as those of U.S. Pat. No. 5,498,457, however, the reaction that propagates across the entire lubricant layer until a large molecular network is formed prevents or hinders this self-replenishing ability.

Therefore, there remains an unfulfilled need for an improved lubricating compound capable of being laminated over a magnetic recording medium so that the resultant hard disk drives can become smaller and lighter, while able to store more and more digital data, are durable and reliable, and at the same time is still able to perform as efficiently as, if not better, than presently available hard disk drives.

Thus, the principal object of the present invention is to provide a new type of perfluoropolyether lubricant. The lubricant is especially useful for a magnetic recording medium (MRM). When applied over the MRM's protective overcoat layer, the resultant lubricating surface adds minimal additional thickness to the MRM, and at the same time maintains a uniform coverage across the MRM's surface, reduces wear and tear and friction between the MRM and the magnetic head, thereby resulting in better reliability and durability of the hard disk drive.

SUMMARY OF THE INVENTION

For the purpose of this description, the magnetic recording medium of the hard disk drive is also abbreviated as MRM, and whenever a MRM is mentioned, it is understood that the MRM is comprised of at least a substrate, a magnetic recording layer, a protective layer (e.g., a carbon layer) and a lubricating layer. Other variations of an MRM exist, but they essentially serve the same function, which is to store digital data within a hard disk drive, and shall be considered the same for the purpose of this description.

According to one aspect of the invention, there is provided an ionic lubricant compound having a perfluoropolyether main chain, wherein each end of the perfluoropolyether main chain is terminated by an end group; and at least one of the end groups comprises an ionic bond and at least one functional group.

Two reactants, with one providing the perfluoropolyether (PFPE) main chain of the lubricant according to an embodiment of the present invention, are chemically reacted to give rise to an ionic PFPE lubricant.

According to one preferred feature, the ionic bond is between a carboxylic acid group and a basic amino group.

The carboxylic acid group donates a hydrogen ion (H+) to the nitrogen lone pair of the amino group and forms an ammonium ion.

In one embodiment, the end group comprises hydrocarbon chain.

The physical and chemical characteristics of a typical hydrocarbon chain, including insolubility in water and solubility in certain organic solvents, become a part of the physical and chemical characteristics of the resultant PFPE lubricant.

In another embodiment, the end group comprises a fluorocarbon chain.

Similarly, the physical and chemical characteristics of a typical fluorocarbon chain, including insolubility in water and most organic solvents, become a part of the physical and chemical characteristics of the resultant PFPE lubricant.

In a further embodiment, the end group comprises from 3 to 6 carbon atoms.

In yet another embodiment, the functional group is a hydroxyl group.

In another embodiment, the functional group is a phenyl group.

The functional group allows the lubricant molecule to anchor/adhere itself to the protective overcoat layer/protective layer, which contains carbon. As hydroxyls are highly reactive, with the electronegativity of the oxygen atom substantially greater than the hydrogen atom, the hydroxyl group anchors/adheres the lubricant molecule to the protective overcoat layer.

Similarly, a functional group comprising phenyl is highly reactive, enabling it to anchor/adhere the lubricant molecule to the protective overcoat layer. Phenyls, however, possess an additional advantage over hydroxyls in that they are also structurally flatter than hydroxyls, thus can adhere closer to the protective overcoat layer.

In another embodiment, the ionic bond is at least two chemical bonds from the end of the perfluoropolyether main chain.

In a further embodiment, the perfluoropolyether main chain is represented by chemical formula (A) as follows

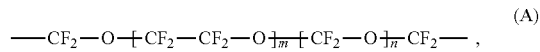

(A)

where m, n are positive integers.

Formula (A) represents the back bone of the preferred PFPE molecule according to one of the embodiments of the present invention.

In yet another embodiment, the perfluoropolyether main chain is represented by chemical formula (B) as follows:

$$—O—(CF_2—CF_2—CF_2—O)_m— \quad (B),$$

where m is a positive integer.

As an alternative to formula (A), formula (B) is able to replace the preferred PFPE main chain according to one of the embodiments of the present invention.

In a further embodiment, the perfluoropolyether main chain is represented by chemical formula (C) as follows:

$$—O—(CF—CF_2—O)_m— \quad (C),$$

where m is a positive integer.

Similarly, as an alternative to formula (A), formula (C) is able to replace the preferred PFPE main chain according to one of the embodiments of the present invention.

In yet another embodiment, the perfluoropolyether main chain is represented by chemical formula (D) as follows:

$$—O—(CF(CF_3)—CF_2—O)_m— \quad (D),$$

where m is a positive integer.

As yet another alternative to formula (A), formula (D) is able to replace the preferred PFPE main chain according to one of the embodiments of the present invention.

According to one embodiment, an ionic lubricant is represented by chemical formula (1) as follows:

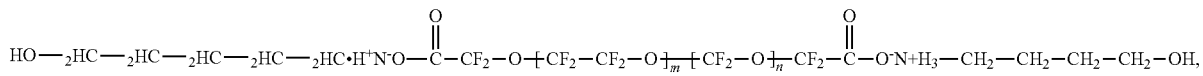

(1)

where m and n are positive integers.

The lubricant represented by formula (1) has an ionic bond and a hydroxyl group located at each end of the perfluoropolyether main chain. The ionic bonds and the hydroxyl groups are located in the end groups.

In another embodiment, an ionic lubricant is represented by chemical formula (2) as follows:

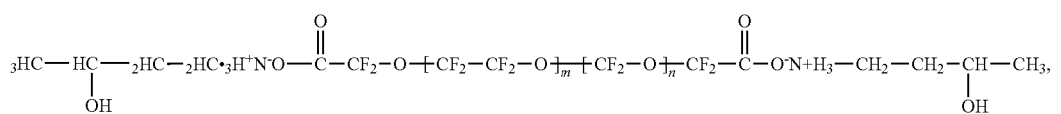

(2)

where m and n are positive integers.

The lubricant represented by formula (2) has an ionic bond and a hydroxyl group located at each end of the perfluoropolyether main chain. The ionic bonds and the hydroxyl groups are located in the end groups, and the hydroxyl groups branches from the linear PFPE molecule.

According to a further embodiment, an ionic lubricant is represented by chemical formula (3) as follows:

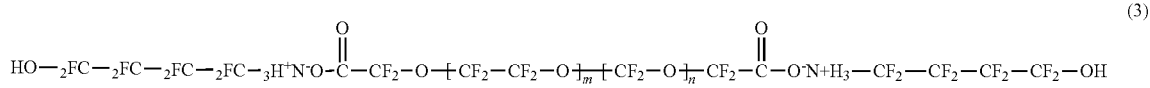

(3)

where m and n are positive integers.

The lubricant represented by formula (3) has an ionic bond and a hydroxyl group located at each end of the perfluoropolyether main chain. The ionic bonds and the hydroxyl groups are located in the end groups.

In yet another embodiment, an ionic lubricant is represented by chemical formula (4) as follows:

The lubricant represented by formula (4) has an ionic bond and two hydroxyl groups located at each end of the perfluoropolyether main chain. The ionic bonds and the hydroxyl groups are located in the end groups.

In a further embodiment, an ionic lubricant is represented by chemical formula (5) as follows:

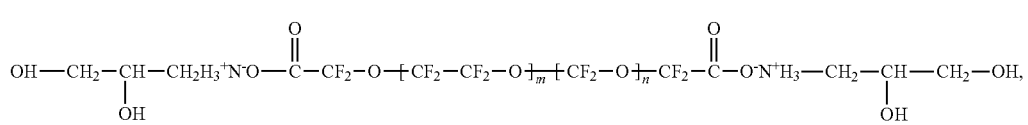

(4)

where m and n are positive integers.

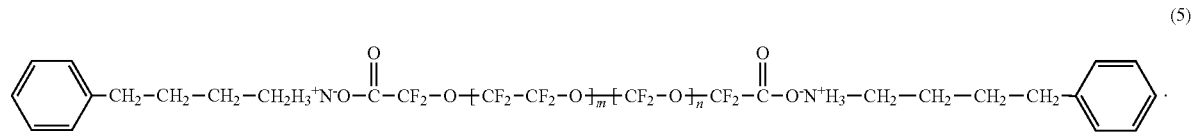

(5)

The lubricant represented by formula (5) has an ionic bond and a phenyl group located at each end of the perfluoropolyether main chain. The ionic bonds and phenyl groups are located in the end groups.

According to another aspect, the invention provides a magnetic recording medium, comprising a substrate and at least a magnetic layer, a protective layer, and a lubricating layer provided in the order recited over the substrate, wherein the lubricating layer is comprised of: a single lubricant compound having a perfluoropolyether main chain; each end of the perfluoropolyether main chain is terminated by an end group; and at least one of the end groups comprises an ionic bond and at least one functional group.

In one embodiment, the ionic bond is at least two chemical bonds from the end of the perfluoropolyether main chain.

In another embodiment, the end group comprises a hydrocarbon chain.

In another embodiment, the end group comprises a fluorocarbon chain.

In a further embodiment, the end group comprises from 3 to 6 carbon atoms.

In yet another embodiment, the functional group is a hydroxyl group.

In yet a further embodiment, the functional group is a phenyl group.

BRIEF DESCRIPTION OF THE DRAWING

The invention will be described in conjunction with a single drawing which is only for the purpose of illustrating the embodiments of the present invention, and not for the purpose of limiting the present invention.

FIG. 1 is a cross-sectional view of a magnetic recording medium according to an embodiment of the present invention.

DETAILED DESCRIPTION OF THE INVENTION

The invention is described in detail in reference to the Examples below and the accompanying FIG. 1.

The invention relates to an ionic type perfluoropolyether lubricant. The lubricant is especially suited for the lubrication of a magnetic recording medium (MRM). The lubricant is applied as a lubricating layer 4 over the top surface of the magnetic disk, which is typically a carbon coated protective overcoat layer 3. Due to its molecular structure, the lubricant can easily achieve a thin but uniform coverage over the entire surface of the MRM, which is preferred for example in an ultra compact portable hard disk drive with high storage capacities, for example, in the range of 1 to 3 terabytes (TB). The ultra thin lubrication layer 4 allows the MRM to rotate closer to the magnetic head, reduces wear and tear of the MRM, thus achieving high capacity storage while keeping the portable hard disk drive reliable and durable, despite its ultra compact dimensions.

In an example of the present invention, the lubricant is PFPE type consisting of a main chain and two end groups each terminating the main chain. The main chain has the following chemical formula (A):

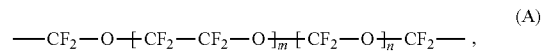

where m, n are positive integers.

The lubricant molecule has only one main chain of formula (A). This feature is preferable in obtaining the desired low viscosity of the lubricant. Formula (A) is the main chain of a common PFPE, commercially known as Fomblin® PFPE. Fomblin® lubricants are fluorinated lubricants most suitable in aggressive chemical environments, high temperatures or where wide working-temperature ranges are involved.

Notwithstanding the above PFPE main chain, other types of PFPE main chain may also be used, such as —O—(CF$_2$—CF$_2$—CF$_2$—O)$_m$— (Demnum®), —O—(CF—CF$_2$—O)$_m$—, or —O—(CF(CF$_3$)—CF$_2$—O)$_m$—.

Preferably, each end group of the lubricant molecule has at least one ionic bond and at least one functional group.

The ionic bond furnishes the lubricant with unique characteristics. The presence of ionic bond as a result of the strong electrostatic interaction between the cation and the anion in the salts could raise the boiling point of the ionic lubricant. Conventional lubricants which consist of mainly covalent bond may suffer the disadvantage of undergoing evaporation with time at high operating temperatures, hence reducing their protection effects over the MRM surface. The use of low-volatility ionic lubricant will help to reduce the evaporation rate and prolong the life of the MRM.

The example of ionic bond is O$^-$N$^+$ derived from carboxylic acid group (—COOH) and amino group. Carboxylic acid can donate a hydrogen ion (H+) to the nitrogen lone pair of the amino group.

The lubricant has at least one functional group in the end group. The first preferred functional group in an embodiment of the present invention is a hydroxyl group (—OH). A second preferred functional group in an embodiment of the present invention is a phenyl group. It is of course to be appreciated that other functional groups may be used as well. The functional group will interact with the elements, such as carbon, of the protective overcoat layer 3 and anchor the lubricant molecule to the protective overcoat layer 3. This will give the lubricant molecules an adhesive force to latch onto the protective overcoat layer 3. The adhesive force will help to prevent the lubricant molecules from being scattered when the MRM is in use. Most hard disk drives spin their magnetic recording medium up to 7200 RPM when in use. Therefore, this adhesive characteristic is obviously advantageous when the lubricant molecules are subjected to such high centrifugal force by the spinning MRM.

The examples of the end groups are represented by formula (E) to (I) which follow.

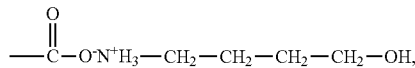
(E)

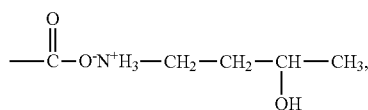
(F)

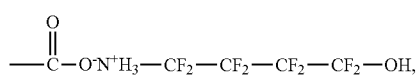
(G)

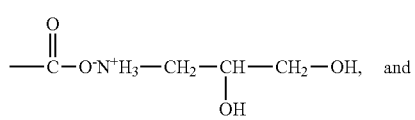
(H)

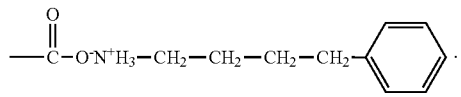
(I)

The number of carbons in the end group may be changed from the above examples. The preferred number of carbon atoms in the end group according to an embodiment of the present invention is from 3 to 6 carbon atoms. By increasing the carbon atoms of non-polar component (in case of the figures above, carbons disposed at right side of the ionic bond) in the end group, this could improve the solubility of the ionic salt in organic solvent. Apart from that, by introducing hydrocarbon chain into the lubricant is also beneficial in order to achieve a balance of the hydrophobic and hydrophilic properties of the lubricant to ensure better coverage and low friction coefficient of the lubricants.

It is possible to adopt two or more functional groups in the lubricant.

EXAMPLE 1

The lubricant material was obtained by reacting the Fomblin® Z DIAC PFPE lubricant (manufactured by Solvay Specialty Polymers) with the amino-alcohol molecule. The mixture of Z DIAC and a 5% excess of the long chain amino-alcohol is warmed to 80-90° C. with constant stirring until complete dissolution is obtained. The salt formed after the reaction is then rinsed with hexane in order to remove the excess amino-alcohol. The chemical structure of the synthesized ionic salt can be characterized by infrared spectroscopy (FT-IR).

Scheme 1 below illustrates the synthetic scheme for the proposed ionic lubricant formula (1). Fomblin Z DIAC, i.e., $COOHCF_2O[CF_2CF_2O]m[CF_2O]nCF_2COOH$, and 4-amino-1-butanol are used. The carboxylic acid end group (—COOH) donates a hydrogen ion (H+) to the nitrogen lone pair of the amino group and forms ammonium ion. Both end groups have long chain hydrocarbon with an ester, amide, alcohol and carboxylate ammonium salt. The hydroxyl group (—OH) in 4-amino-1-butanol anchors or adhere the resultant molecule to MRM's protective overcoat layer 3, which comprises carbon.

Scheme 1:

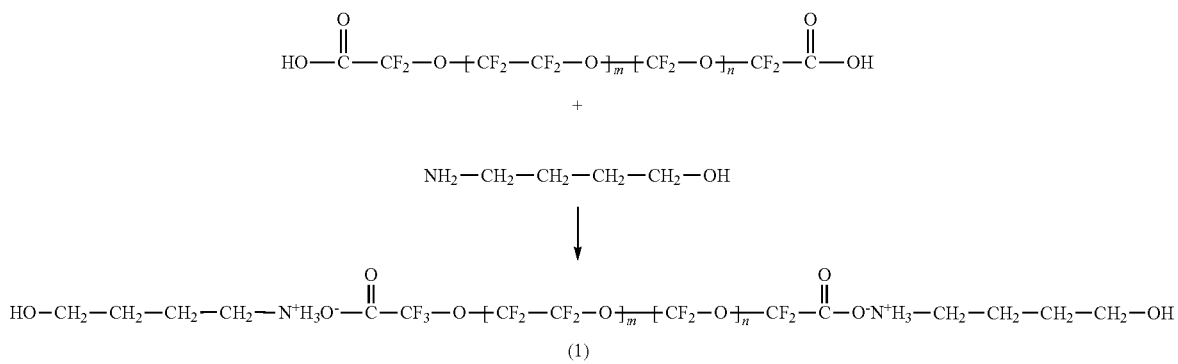

where m, n are positive integers.

EXAMPLE 2

The lubricant material was obtained by reacting the Fomblin® Z DIAC PFPE lubricant (manufactured by Solvay Specialty Polymers) with 4-amino-2-propanol. The mixture of Z DIAC and a 5% excess of the long chain 4-amino-2-propanol is warmed to 80-90° C. with constant stirring until complete dissolution is obtained. The salt formed after the reaction is then rinsed with hexane in order to remove the excess amino-alcohol. The chemical structure of the synthesized ionic salt can be characterized by infrared spectroscopy (FT-IR).

Scheme 2 which follows illustrates the synthetic scheme for the proposed ionic lubricant formula (2). Fomblin Z DIAC, i.e., COOHCF$_2$O[CF$_2$CF$_2$O]m[CF$_2$O]nCF$_2$COOH, and 4-amino-2-propanol are used. The carboxylic acid end group (—COOH) donates a hydrogen ion (H+) to the nitrogen lone pair of the amino group and forms ammonium ion. Both end groups have long chain hydrocarbon with an ester, amide, alcohol and carboxylate ammonium salt. The hydroxyl group (—OH) in 4-amino-2-propanol anchors or adhere the resultant molecule to MRM's protective overcoat layer 3, which comprises carbon. The hydroxyl group acts as the branched group from the linear PFPE ionic molecule.

Solvay Specialty Polymers) with 4-amino-1-fluorobutanol. The mixture of Z DIAC and a 5% excess of the long chain 4-amino-1-fluorobutanol is warmed to 80-90° C. with constant stirring until complete dissolution is obtained. The salt formed after the reaction is then rinsed with hexane in order to remove the excess amino-alcohol. The chemical structure of the synthesized ionic salt can be characterized by infrared spectroscopy (FT-IR). Replacing the hydrocarbon chain (—CH$_2$—) with a fluorocarbon chain (—CF$_2$—) improves the wettability and solubility of the resultant lubricant. The resultant lubricant is also chemically and thermally more stable than its hydrocarbon counterpart.

Scheme 3 which follows illustrates the synthetic scheme for the proposed ionic lubricant formula (3). Fomblin Z DIAC, i.e., COOHCF$_2$O[CF$_2$CF$_2$O]m[CF$_2$O]nCF$_2$COOH, and 4-amino-1-fluorobutanol are used. The carboxylic acid end group (—COOH) donates a hydrogen ion (H+) to the nitrogen lone pair of the amino group and forms ammonium ion. Both end groups have long chain fluorocarbon with an ester, amide, alcohol and carboxylate ammonium salt. The hydroxyl group (—OH) in 4-amino-1-fluorobutanol anchors or adhere the resultant molecule to MRM's protective overcoat layer 3, which comprises carbon.

Scheme 2:

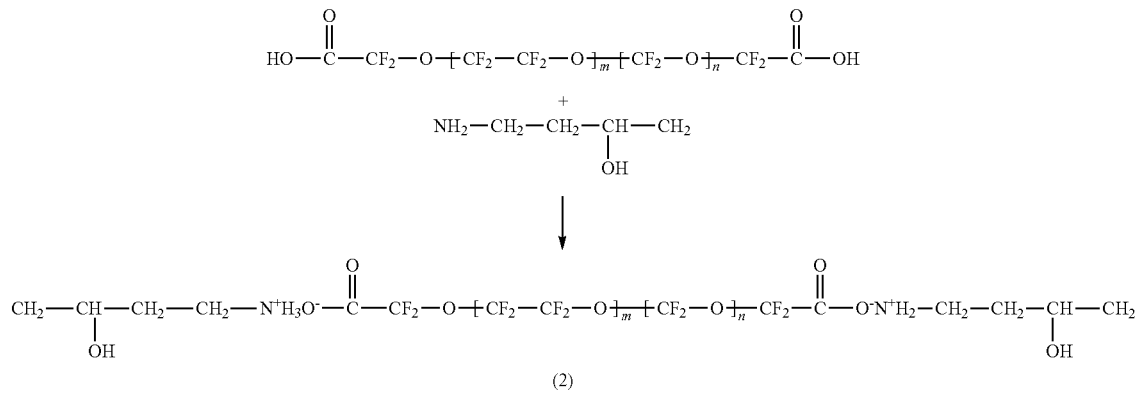

(2)

where m, n are positive integers.

EXAMPLE 3

The lubricant material was obtained by reacting the Fomblin® Z DIAC PFPE lubricant (manufactured by Scheme 3:

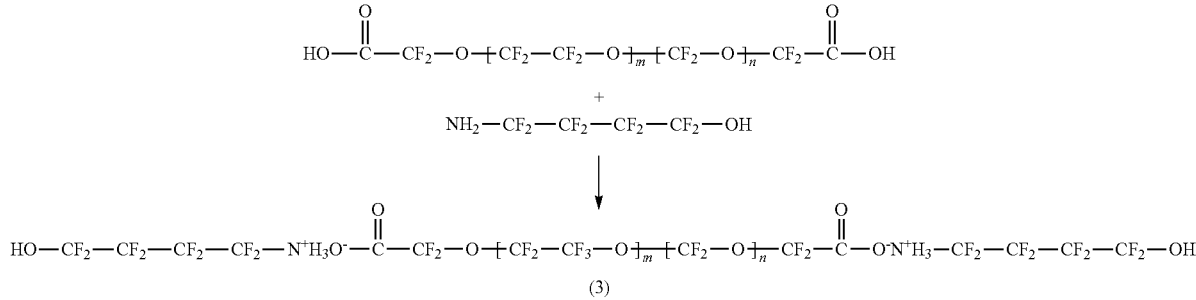

(3)

where m, n are positive integers.

EXAMPLE 4

The lubricant material was obtained by reacting the Fomblin® Z DIAC PFPE lubricant (manufactured by Solvay Specialty Polymers) with the amino-alcohol molecule. The mixture of Z DIAC and a 5% excess of the long chain amino-alcohol is warmed to 80-90° C. with constant stirring until complete dissolution is obtained. The salt formed after the reaction is then rinsed with hexane in order to remove the excess amino-alcohol. The chemical structure of the synthesized ionic salt can be characterized by infrared spectroscopy (FT-IR).

Scheme 4 which follows illustrates the synthetic scheme for the proposed ionic lubricant formula (4). Fomblin Z DIAC, i.e., $COOHCF_2O[CF_2CF_2O]m[CF_2O]nCF_2COOH$, and the diol of $NH_2CH_2CHOHCH_2OH$ (3-aminopropan-1,2-ol) are used. The carboxylic acid end group (—COOH) donates a hydrogen ion (H+) to the nitrogen lone pair of the amino group and forms ammonium ion. Both end groups have long chain hydrocarbon with an ester, amide, alcohol and carboxylate ammonium salt. The hydroxyl group (—OH) in 3-aminopropan-1,2-ol anchors or adhere the resultant molecule to MRM's protective overcoat layer 3. It is note that the terminal ends have two hydroxyl groups, and thereby providing stronger anchoring/adhesive power to the MRM's protection layer, which comprises carbon.

Solvay Specialty Polymers) with 4-phenylbutylamine. The mixture of Z DIAC and a 5% excess of the long chain 4-phenylbutylamine is warmed to 80-90° C. with constant stirring until complete dissolution is obtained. The salt formed after the reaction is then rinsed with hexane in order to remove the excess phenylbutylamine. The chemical structure of the synthesized ionic salt can be characterized by infrared spectroscopy (FT-IR). Replacing the hydroxyl group (—OH) with phenyl group (—$C_5H_5$) improves lubricant coverage, as phenyl rings are flatter than hydroxyls. This results in a thinner lubrication layer, and thus reduces the magnetic spacing further.

Scheme 5 which follows illustrates the synthetic scheme for the proposed ionic lubricant formula (5). Fomblin Z DIAC, i.e., $COOHCF_2O[CF_2CF_2O]m[CF_2O]nCF_2COOH$, and 4-phenylbutylamine are used. The carboxylic acid end group (—COOH) donates a hydrogen ion (H+) to the nitrogen lone pair of the amino group and forms ammonium ion. Both end groups have long chain hydrocarbon with an ester, amide, benzene and carboxylate ammonium salt. The phenyl group ($C_6H_5$) in 4-phenylbutylamine can lie flatter and adhere the resultant molecule to MRM's protective overcoat layer 3, which comprises carbon.

Scheme 4:

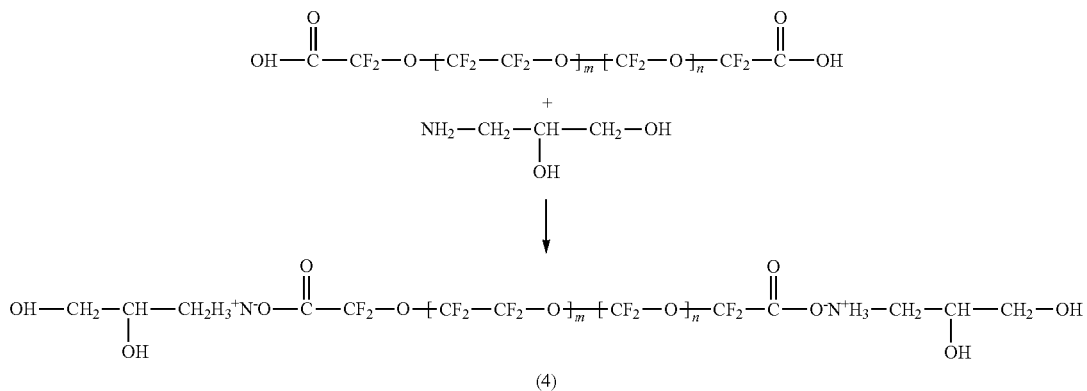

(4)

where m, n are positive integers.

EXAMPLE 5

The lubricant material was obtained by reacting the Fomblin® Z DIAC PFPE lubricant (manufactured by Scheme 5:

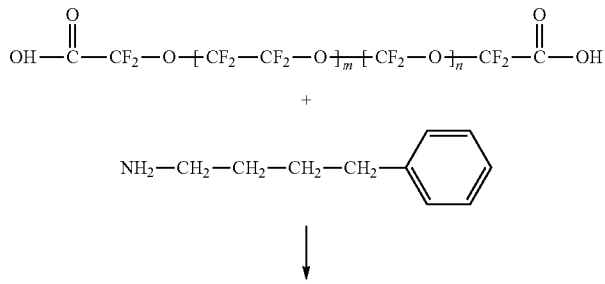

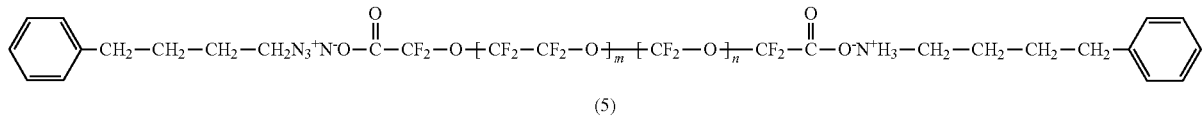

(5)

EXAMPLE 6

The magnetic recording medium with the cross-sectional view as shown in FIG. 1 with the lubricant represented by the formulae (1) through (5) is prepared.

The substrates used are 65 mm diameter rigid magnetic disks 5 composed of glass substrates 1. A magnetic layer 2 comprised of chromium and cobalt-based recording layer is sputter-deposited onto the substrate followed by the deposition of protective nitride carbon overcoat layer 3 through plasma-enhanced chemical vapor deposition (PECVD) process. The lubricant 4 is applied onto the protective overcoat layer 3 by using a dip-coating method. Each of the ionic lubricant material of formulae (1) through (4) is mixed with fluorinated solvent. The solvent was Vertrel/methanol (manufactured by Dupont). The concentration of the lubricant material in the solution was 0.5% by weight. The film thickness after dipping was quantified using FT-IR spectroscopy method (grazing angle). Each sample showed satisfactory results.

The number of main chains in every embodiment of the present invention is kept to a minimum, which resulted in small, uncomplicated lubricant molecules. The presence of an ionic bond at the end group gives the lubricant physical properties that are typical of ionic bonds including high boiling point, and partial solubility in water when combined with the hydrophobic properties of the hydrocarbon and fluorocarbon end groups. The presence of the functional group, hydroxyl, anchors/adheres the lubricant molecule to the carbon-based protective overcoat layer 3 (protective layer), and this maintains the lubricant molecules firmly over the protective overcoat layer 3.

Therefore, it can be surmised that ionic PFPE lubricants of the kind represented by the five types of ionic PFPE lubricants described in examples 1 through 5 of the description have the potential to provide advantageous results and properties over existing PFPE lubricants, in terms of distribution uniformity, protection/operation longevity, and improved recording density as a result of reduced magnetic spacing when applied to a magnetic recording medium (MRM).

It is understood that the invention may be embodied in numerous other ways without departing from the scope of the invention.

What is claimed is:

1. An ionic lubricant, comprising:
a single lubricant compound having a perfluoropolyether main chain and ends, each end of the perfluoropolyether main chain being terminated by an end group, and at least one end group consisting of an ionic bond, at least one functional group, and a hydrocarbon chain interposed between the ionic bond and the at least one functional group,
wherein the perfluoropolyether main chain is represented by one of chemical formulae (A) through (D) as follows:

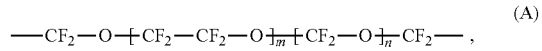  (A)

where m and n are positive integers,

  (B), where m is a positive integer,

  (C), where m is a positive integer, and

  (D), where m is a positive integer, and
wherein the ionic bond is positioned between a carboxylic acid group and a basic amino group, and
wherein the at least one functional group is a hydroxyl group or a phenyl group.

2. The ionic lubricant according to claim 1, wherein the at least one end group comprises from 3 to 6 carbon atoms.

3. The ionic lubricant according to claim 1, wherein the ionic bond is positioned at least two chemical bonds from the end of the perfluoropolyether main chain.

4. An ionic lubricant represented by chemical formulae (1) through (5) as follows:

(1)

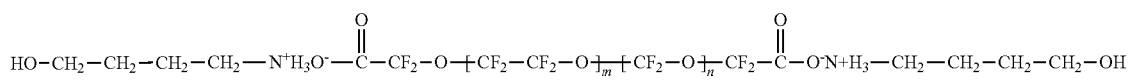

where m and n are positive integers,

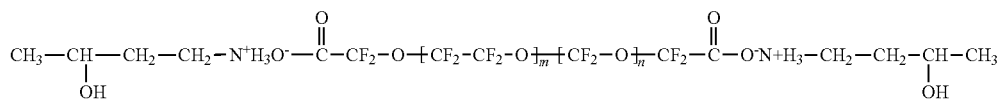
(2)

where m and n are positive integers,

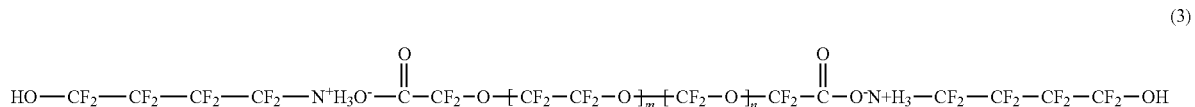
(3)

where m and n are positive integers,

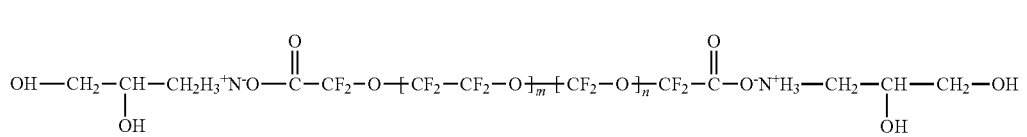
(4)

where m and n are positive integers, and

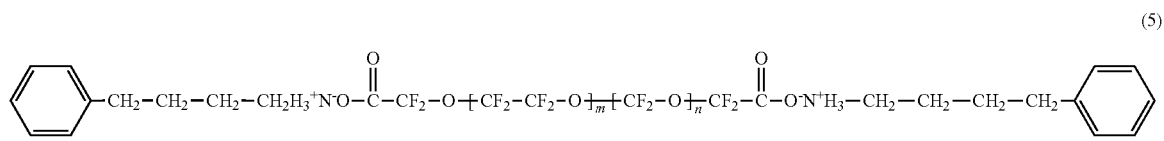
(5)

where m and n are positive integers.

5. A magnetic recording medium, comprising:
a substrate;
a magnetic layer provided over the substrate;
a protective layer provided over the magnetic layer; and
a lubricating layer provided over the protective layer and being comprised of the single lubricant compound according to claim 1.

6. The magnetic recording medium according to claim 5, wherein the ionic bond is positioned at least two chemical bonds from the end of the perfluoropolyether main chain.

7. The magnetic recording medium according to claim 5, wherein the at least one end group comprises from 3 to 6 carbon atoms.

8. An ionic lubricant, comprising:
a single lubricant compound having a perfluoropolyether main chain and ends, each end of the perfluoropolyether main chain being terminated by an end group, and at least one end group consisting of an ionic bond, at least one functional group, and a fluorocarbon chain interposed between the ionic bond and the at least one functional group,
wherein the perfluoropolyether main chain is represented by one of chemical formulae (A) through (D) as follows:

$$—CF_2—O—(CF_2—CF_2—O)_m(CF_2—O)_n—CF_2—,$$ (A)

where m and n are positive integers, $$—O—(CF_2—CF_2—CF_2—O)_m—$$ (B), where m is a positive integer, $$—O—(CF—CF_2—O)_m—$$ (C), where m is a positive integer, and $$—O—(CF(CF_3)—CF_2—O)_m—$$ (D), where m is a positive integer, and
wherein the ionic bond is positioned between a carboxylic acid group and a basic amino group, and
wherein the at least on functional group is a hydroxyl group or a phenyl group.

9. The ionic lubricant according to claim 8, wherein the end group comprises from 3 to 6 carbon atoms.

10. The ionic lubricant according to claim 8, wherein the ionic bond is positioned at least two chemical bonds from the end of the perfluoropolyether main chain.

11. A magnetic recording medium, comprising:
a substrate;
a magnetic layer provided over the substrate;
a protective layer provided over the magnetic layer; and
a lubricating layer provided over the protective layer and being comprised of the single lubricant compound according to claim 8.

12. The ionic lubricant according to claim 11, wherein the end group comprises from 3 to 6 carbon atoms.

13. The magnetic recording medium according to claim 11, wherein the ionic bond is at least two chemical bonds from the end of the perfluoropolyether main chain.

* * * * *